US009053512B1

(12) United States Patent  (10) Patent No.: US 9,053,512 B1
Loving et al.  (45) Date of Patent: Jun. 9, 2015

(54) SYSTEM AND METHOD FOR CONVERTING AUTOMATED CLEARING HOUSE DATA

(75) Inventors: Stanley K. Loving, Chesterfield, VA (US); Richard K. Forbis, Howe, TX (US); David P. Drzewi, East Hampton, CT (US); Gerald W. Price, Richmond, VA (US); Susan I. Aucoin, Las Vegas, NV (US)

(73) Assignee: Bank of America Corporation, Charlotte, NC (US)

( * ) Notice: Subject to any disclaimer, the term of this patent is extended or adjusted under 35 U.S.C. 154(b) by 1026 days.

(21) Appl. No.: 12/729,516

(22) Filed: Mar. 23, 2010

(51) Int. Cl.
*G06Q 99/00* (2006.01)
*G06Q 40/00* (2012.01)
G06Q 50/00 (2012.01)

(52) U.S. Cl.
CPC ............... *G06Q 40/00* (2013.01); *G06Q 50/00* (2013.01)

(58) Field of Classification Search
CPC .............................. G06Q 40/00; G06Q 50/00
USPC ................................. 705/1.1, 35, 39
See application file for complete search history.

(56) References Cited

U.S. PATENT DOCUMENTS

| 7,716,190 B2* | 5/2010 | Mendis et al. ................ 707/694 |
| 2003/0078883 A1* | 4/2003 | Stewart et al. .................. 705/39 |
| 2006/0167909 A1* | 7/2006 | Mendis et al. ................ 707/101 |
| 2010/0042536 A1* | 2/2010 | Thorson et al. ................. 705/39 |

* cited by examiner

*Primary Examiner* — James D Nigh
(74) *Attorney, Agent, or Firm* — Michael A. Springs (57) ABSTRACT

A method includes determining by a computing system a plurality of automated clearing house (ACH) data conversion rules and converting ACH data into converted ACH data according to the determined ACH data conversion rules. Each of the plurality of ACH data conversion rules includes a name associated with a source data field, a name associated with a target data field, and an instruction indicating how to convert ACH data in the source data field into converted ACH data to be stored in the target data field.

19 Claims, 3 Drawing Sheets

FIG. 3

SYSTEM AND METHOD FOR CONVERTING AUTOMATED CLEARING HOUSE DATA

TECHNICAL FIELD OF THE INVENTION

The present invention relates generally to financial services and more specifically to a system and method for converting automated clearing house data.

BACKGROUND OF THE INVENTION

Financial institutions such as banks offer many services to their customers. One such service is the ability to electronically transfer funds between institutions. To facilitate such transfers, financial institutions typically utilize an Automated Clearing House (ACH) system. Typical ACH data, however, are not compatible with certain ACH systems.

SUMMARY OF THE INVENTION

In accordance with the present invention, the disadvantages and problems associated with utilizing automated clearing house (ACH) data in different ACH systems have been substantially reduced or eliminated.

According to one embodiment of the present invention, a method includes determining by a computing system a plurality of ACH data conversion rules and converting ACH data into converted ACH data according to the determined ACH data conversion rules. Each of the plurality of ACH data conversion rules includes a name associated with a source data field, a name associated with a target data field, and an instruction indicating how to convert ACH data in the source data field into converted ACH data to be stored in the target data field.

Certain embodiments of the disclosure may provide one or more advantages. An advantage of one embodiment may be that ACH data may be converted into a format to be compatible with various ACH systems quickly and efficiently.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
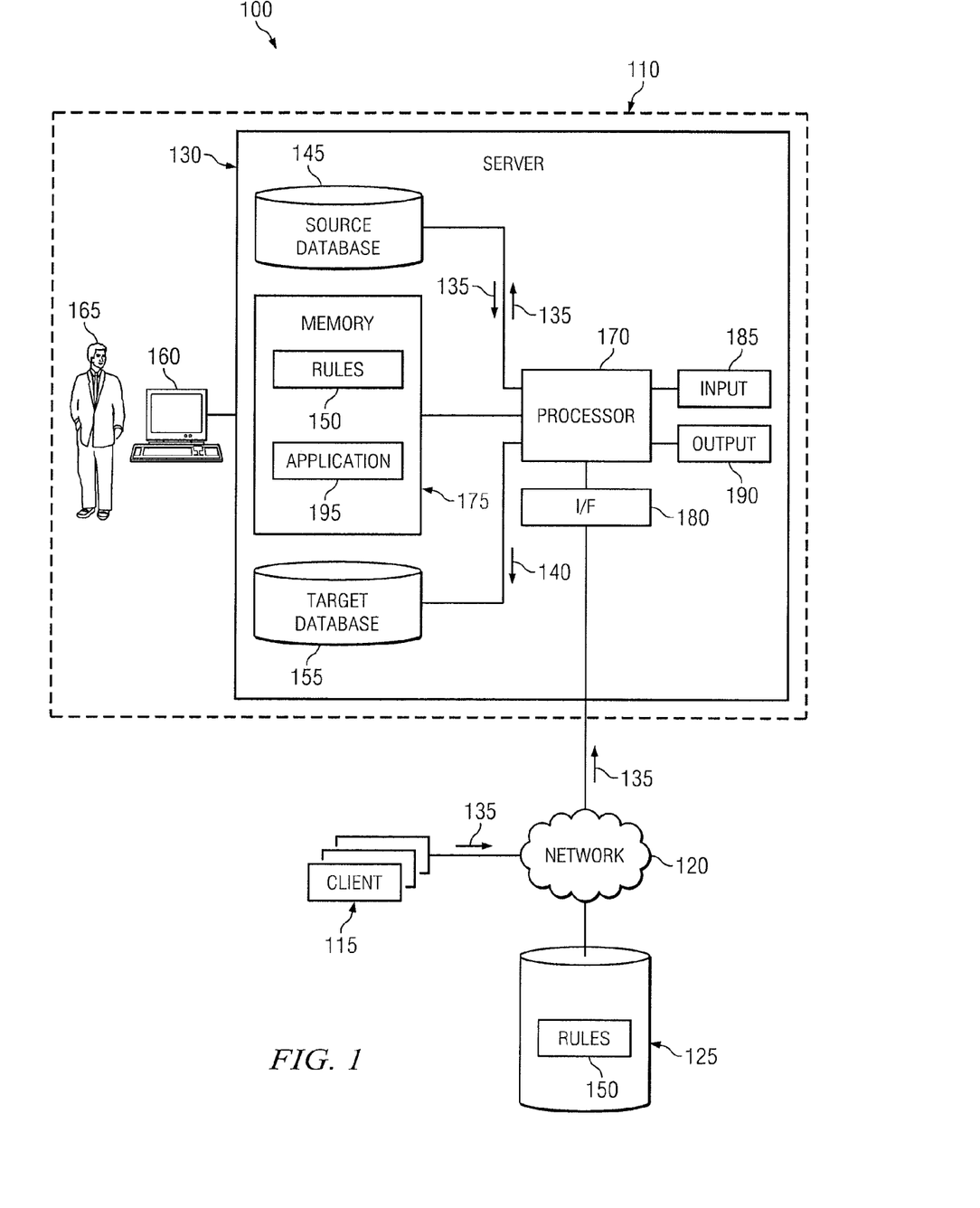
FIG. 1 illustrates a system for converting automated clearing house data, according to certain embodiments.
Figure 2:
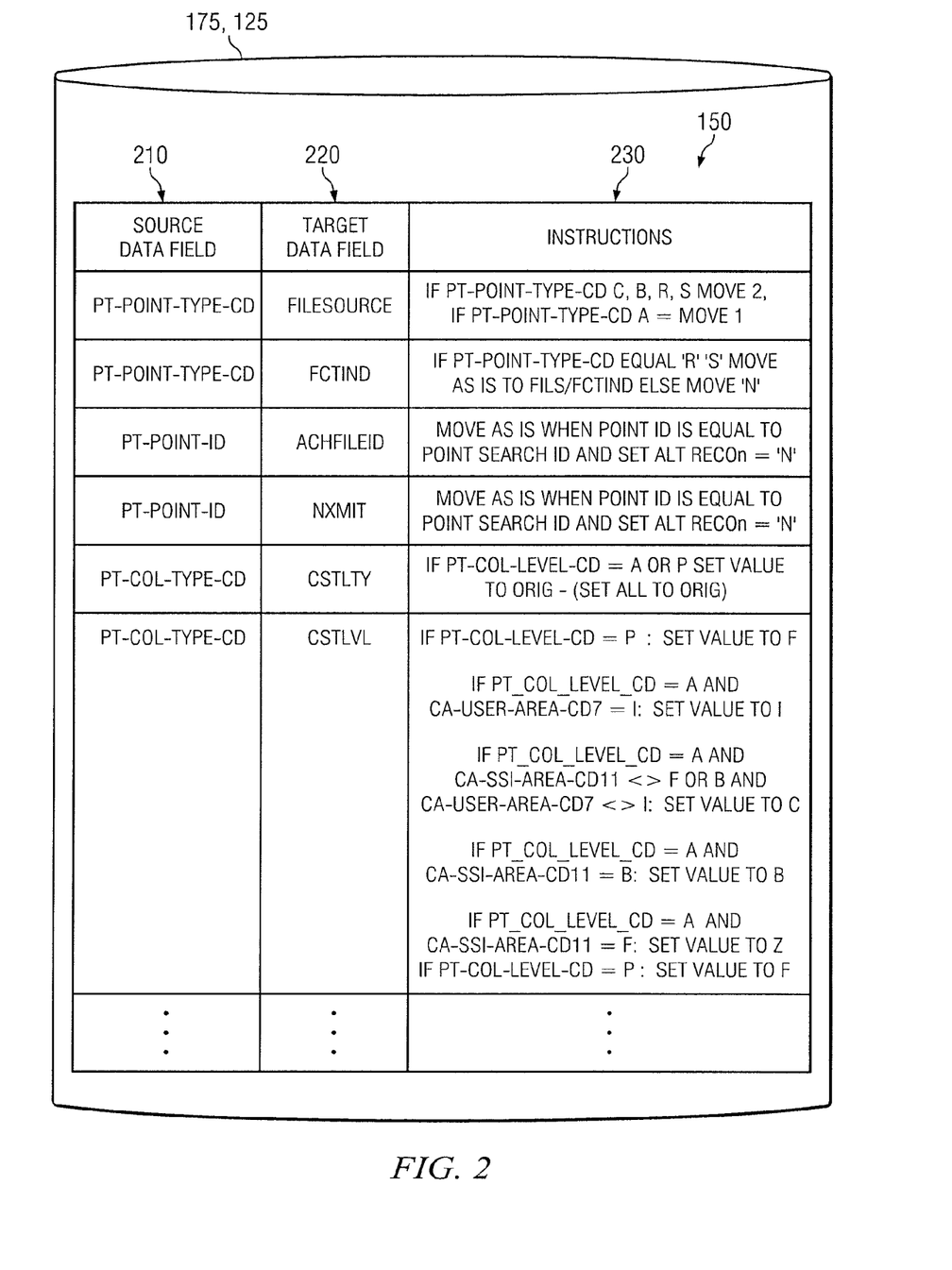
FIG. 2 illustrates conversion rules that may be utilized by the system of FIG. 1 to convert automated clearing house data, according to certain embodiments.
Figure 3:
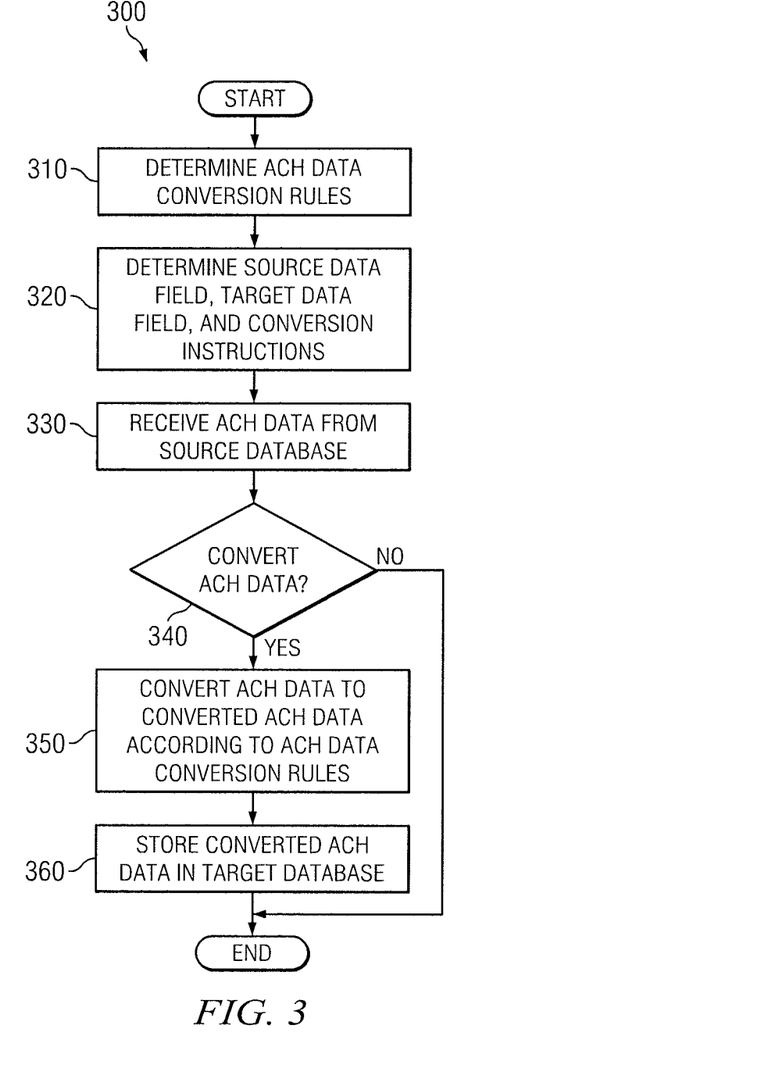
FIG. 3 illustrates a method for converting automated clearing house data, according to certain embodiments.

Embodiments of the present invention and its advantages are best understood by referring to FIGS. 1 through 3 of the drawings, like numerals being used for like and corresponding parts of the various drawings.

Banks and other financial institutions typically provide their customers the ability to electronically transfer funds. Such electronic fund transfers are typically handled by automated clearing house (ACH) systems. Every financial institution, however, typically utilizes its own proprietary ACH system and databases. Consequently, ACH data stored on one financial institution's ACH system is not compatible with another financial institution's ACH system.

The teachings of the disclosure recognize that it would be desirable to provide a system and method for converting ACH data to be compatible with other ACH systems. FIGS. 1 through 3 below illustrate a system and method of converting ACH data according to the teachings of the disclosure.

FIG. 1 illustrates a system 100 according to certain embodiments. System 100 may include an enterprise 110, one or more clients 115, a network storage device 125, and a server 130. Enterprise 110, clients 115, server 130, and network storage device 125 may be communicatively coupled by a network 120. Clients 115 may transmit ACH data 135 to server 130 via network 120. Enterprise 110 is generally operable to convert ACH data 135 and provide converted ACH data 140, as described below.

In general, server 130 may convert ACH data 135 from clients 115 into converted ACH data 140. Clients 115 may first provide ACH data 135 to server 130 via network 120. Server 130 may then store ACH data 135 in a source database 145. Server 130 may then retrieve ACH data 135 from source database 145 and convert ACH data 135 to converted ACH data 140 based on ACH data conversion rules 150. Server 130 may then store converted ACH data 140 in a target database 155.

Client 115 may refer to any device or institution that supplies ACH data 135 to server 130. In some embodiments, client 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. It will be understood that system 100 may comprise any number and combination of clients 115. Clients 115 supply ACH data 135 to server 130 where it is converted to ACH data 140 by server 130, as described below.

In some embodiments, network storage device 125 may refer to any suitable device communicatively coupled to network 120 and capable of storing and facilitating retrieval of data and/or instructions. Examples of network storage device 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile computer-readable memory devices that store one or more files, lists, tables, or other arrangements of information. Network storage device 125 may store any data and/or instructions utilized by server 130. In the illustrated embodiment, network storage device 125 stores ACH data conversion rules 150. ACH data conversion rules 150 may be any set of business and/or conversion rules utilized by server 130 to convert ACH data 135 to converted ACH data 140. A particular embodiment of ACH data conversion rules 150 is described in more detail below in reference to FIG. 2.

In certain embodiments, network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, enterprise 110 may refer to a financial institution such as a bank and may include server 130, an administrator workstation 160, and an administrator 165. In some embodiments, server 130 may refer to any suitable combination of hardware and/or software implemented in one or more Modules to process data and provide the described functions and operations. In some embodiments, the functions and operations described herein may be performed by a pool of servers 130. In some embodiments, server 130 may include, for example, a mainframe, server, host computer, workstation, web server, file server, a personal computer such as a laptop, or any other suitable device operable to process data. In some embodiments, server 130 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, server 130 provides converted ACH data 140 to target database 155. In some embodiments, servers 130 may include a processor 170, source database 145, target database 155, server memory 175, an interface 180, an input 185, and an output 190. Server memory 175 may refer to any suitable device capable of storing and facilitating retrieval of data and/or instructions. Examples of server memory 175 include computer memory (for example, RAM or ROM), mass storage media (for example, a hard disk), removable storage media (for example, a CD or a DVD), database and/or network storage (for example, a server), and/or or any other volatile or non-volatile computer-readable memory devices that store one or more files, lists, tables, or other arrangements of information. Although FIG. 1 illustrates server memory 175, source database 145, and target database 155 as internal to server 130, it should be understood that server memory 175 may be internal or external to server 130, depending on particular implementations. Also, server memory 175 may be separate from or integral to other memory devices to achieve any suitable arrangement of memory devices for use in system 100.

Server memory 175 is generally operable to store ACH data conversion rules 150 and an application 195. Application 195 generally refers to logic, rules, algorithms, code, tables, and/or other suitable instructions for performing the described functions and operations. In certain embodiments, application 195 may be the primary data integration software application by INFORMATICA™. ACH data conversion rules 150 may include any set of business and/or conversion rules utilized by server 130 to convert ACH data 135 to converted ACH data 140. A particular embodiment of ACH data conversion rules 150 is described in more detail below in reference to FIG. 2.

Source database 145 and target database 155 may be any suitable database for storing ACH data. In certain embodiments, source database 145 may be a database by FISERV™. In certain embodiments, target database 155 may be a database by PARITER SOLUTIONS™. Source database 145 and target database 155 each include a plurality of named data fields. For example, source database 145 may include a plurality of named source data fields as shown in TABLE 2 below. Likewise, target database 155 may include a plurality of named target data fields as shown in TABLE 2 below. In general, source database 145 stores ACH data 135 from clients 115 and target database 155 stores converted ACH data 140.

Source database 145, target database 155, and server memory 175 are communicatively coupled to processor 170. Processor 170 is generally operable to execute application 195 stored in server memory 175 to convert ACH data 135 to converted ACH data 140 according to the disclosure. Processor 170 may comprise any suitable combination of hardware and/or software implemented in one or more modules to execute instructions and manipulate data to perform the described functions for server 130. In some embodiments, processor 170 may include, for example, any type of central processing unit (CPU).

In some embodiments, communication interface 180 (I/F) is communicatively coupled to processor 170 and may refer to any suitable device operable to receive input for server 130, send output from server 130, perform suitable processing of the input or output or both, communicate to other devices, or any combination of the preceding. Communication interface 180 may include appropriate hardware (e.g. modem, network interface card, etc.) and/or software, including protocol conversion and data processing capabilities, to communicate through network 120 or other communication system that allows server 130 to communicate to other devices. Communication interface 180 may include any suitable software operable to access data from various devices such as clients 115 and/or network storage device 125. Communication interface 180 may also include any suitable software operable to transmit data to various devices such as clients 115 and/or network storage device 125. Communication interface 180 may include one or more ports, conversion software, or both. In general, communication interface 180 receives ACH data 135 from clients 115 where it is subsequently stored in source database 145 by server 130.

In some embodiments, input device 185 may refer to any suitable device operable to input, select, and/or manipulate various data and information. Input device 185 may include, for example, a keyboard, mouse, graphics tablet, joystick, light pen, microphone, scanner, or other suitable input device. Output device 190 may refer to any suitable device operable for displaying information to a user. Output device 190 may include, for example, a video display, a printer, a plotter, or other suitable output device.

In general, administrator 165 may interact with server 130 using an administrator workstation 160. In some embodiments, administrator workstation 160 may be communicatively coupled to server 130 and may refer to any suitable computing system, workstation, personal computer such as a laptop, or any other device operable to process data. In certain embodiments, an administrator 165 may utilize administrator workstation 160 to manage ACH data conversion rules 150 and any of the data stored in server memory 175 and/or network storage device 125.

In operation, application 195, upon execution by processor 170, converts ACH data 135 stored in source database 145 to converted ACH data 140 that may then be stored in target database 155. To convert ACH data 135 to converted ACH data 140, application 195 may first read ACH data conversion rules 150. In one embodiment, for example, ACH data conversion rules 150 may include the ACH data conversion rules shown in TABLE 2 below.

Once application 195 receives ACH data conversion rules 150, application 195 may analyze ACH data conversion rules 150 in order to determine the source data field, the target data field, and the conversion instructions of each ACH data conversion rule 150. For example, a particular ACH data conversion rule 150 is shown below in TABLE 1.

TABLE 1

| SOURCE DATA FIELD | TARGET DATA FIELD | INSTRUCTIONS |
|---|---|---|
| PT-COL-DA-POINT | SETLACCTTYP | If PT-COL-LEVEL-CD = 'P' and PT-COL-DA-POINT = '9\*\*GL' or PT_COL_DA_APPL_ID = COLLECTGL move 'GL If PT-COL-LEVEL-CD = 'A' and CA_SETT-DA-POINT = '9\*\*GL' or CA_SETT_DA_APPL_ID = COLLECTGL move 'GL Else Move DDA |

For this particular ACH data conversion rule 150, application 195 determines that the name of the source data field is "PT-COL-DA-POINT", the name of the target data field is "SETLACCTTYP," and the conversion instructions are "If PT-COL-LEVEL-CD='P' and PT-COL-DA-POINT= '9\*\*GL' or PT_COL_DA_APPL_ID=COLLECTGL, move 'GL; if PT-COL-LEVEL-CD='A' and CA_SETT-DA-POINT='9\*\*GL' or CA_SETT_DA_APPL_ID=COLLECTGL, move 'GL, else move DDA."

Once application 195 determines the source data field, the target data field, and the conversion instructions of each ACH data conversion rule 150, application 195 then receives ACH data 135 from source database 145. For example, for the particular ACH data conversion rule 150 shown above in TABLE 1, application 195 requests and receives ACH data 135 stored in the "PT-COL-DA-POINT" data field of source database 145.

Once ACH data 135 stored in the "PT-COL-DA-POINT" data field is received, application 195 then converts the received ACH data 135 into converted ACH data 140 per the conversion instructions of the ACH data conversion rule 150. In this particular example, application 195 converts ACH data 135 stored in the "PT-COL-DA-POINT" to 'GL if PT-COL-LEVEL-CD='P' and PT-COL-DA-POINT='9\*\*GL' or PT_COL_DA_APPL_ID=COLLECTGL, or if If PT-COL-LEVEL-CD='A' and CA_SETT-DA-POINT='9\*\*GL' or CA_SETT_DA_APPL_ID=COLLECTGL. Otherwise, application 195 in this particular example will convert the ACH data 135 stored in the "PT-COL-DA-POINT" data field to DDA per the illustrated conversion instructions.

Once ACH data 135 is converted into converted ACH data 140 according to the particular ACH data conversion rule 150, application 195 may store the converted ACH data 140 in the target data field as indicated by the ACH data conversion rule 150. For the above ACH data conversion rule 150, for example, application 195 may store the converted ACH data 140 in the "SETLACCTTYP" data field of target database 155.

In some embodiments, application 195 may be logic encoded in one or more tangible, non-transitory media and may perform operations when executed by a computer. As used herein, logic may include a computer program, software, computer executable instructions, and/or instructions capable of being executed by a computer system. In particular embodiments, the operations of the embodiments may be performed by one or more computer readable media storing, embodied with, and/or encoded with a computer program and/or having a stored and/or an encoded computer program.

As previously described, application 195 may utilize a plurality of ACH data conversion rules 150 in order to convert ACH data of source database 145 into converted ACH data 140 to be stored in target database 155. For example, FIG. 2 illustrates a certain embodiment of ACH data conversion rules 150 that may be stored in server memory 175 and/or network storage device 125 and may be utilized by application 195 to convert ACH data 135 into converted ACH data 140.

In certain embodiments, ACH data conversion rules 150 include source data fields 210, target data fields 220, and conversion instructions 230. Source data fields 210 refer to the names of the source data fields in which ACH data 135 is stored in source database 145. Target data fields 220 refer to the names of the target data fields in which ACH data 135 may be stored in target database 155. Conversion instructions 230 refer to the rules explaining how to convert ACH data in source data fields 210 into converted ACH data 140 that may be stored in target data fields 220.

In certain embodiments, ACH data conversion rules 150 may be the ACH data conversion rules shown below in TABLE 2:

TABLE 2

| SOURCE DATA FIELD | TARGET DATA FIELD | INSTRUCTIONS |
|---|---|---|
| PT-POINT-TYPE-CD | FILESOURCE | If PT-POINT-TYPE-CD C, B, R, S move 2, If PT-POINT-TYPE-CD A = move 1. |
| PT-POINT-TYPE-CD | FCTIND | If PT-POINT-TYPE-CD equal 'R' 'S' move as is to FCTIND ELSE move 'N' |
| PT-POINT-ID | ACHFILEID | Move as is when Point Id is equal to Point Search Id and set ALT RECOn = 'N' |
| PT-POINT-ID | NXMIT | Move as is when Point Id is equal to Point Search Id and set ALT RECOn = 'N' |
| PT-COL-TYPE-CD | CSTLTY | If PT-COL-LEVEL-CD = A or P set value to ORIG -(set all to ORIG) |
| PT-COL-TYPE-CD | CSTLVL | If PT-COL-LEVEL-CD = P : set value to F If PT_COL_LEVEL_CD = A and CA-USER-AREA-CD7 = I: set value to I If PT_COL_LEVEL_CD = A and CA-SSI-AREA-CD11 <> F or B and CA-USER-AREA-CD7 <> I: set value to |

TABLE 2-continued

| SOURCE DATA FIELD | TARGET DATA FIELD | INSTRUCTIONS |
|---|---|---|
| | | C<br>If PT_COL_LEVEL_CD = A and CA-SSI-AREA-CD11= B: set value to B<br>If PT_COL_LEVEL_CD = A and CA-SSI-AREA-CD11= F: set value to Z<br>If PT-COL-LEVEL-CD = P : set value to F |
| PT-COL-ADDR-LINE1 | COSHORTNME | Compress and take first 8 (non-blank characters) |
| PT-COL-LEVEL-CD | RTTRNNBRCSETL | If PT-COL-LEVEL-CD = P move PT-COL-TR as is<br>If PT_COL_LEVEL_CD = A move CA-SETT-TR as is. |
| PT-COL-LEVEL-CD | ACHACCTNBRSETL | If PT-COL-LEVEL-CD = P move PT-COL-ACCT as is<br>If PT_COL_LEVEL_CD = A move CA-SETT-ACCT as is. |
| PT-COL-LEVEL-CD | SETLACCTTYP | If PT-COL-LEVEL-CD = to 'P' and PT-COL-DA-POINT = '9GL' move 'GL<br>If PT-COL-LEVEL-CD = to 'A' and CA_SETT-DA-POINT= '9GL' move 'GL<br>Else Move DDA |
| PT-COL-LEVEL-CD | SETLOPTNCDE | RETN:<br>If PT-COL-LEVEL-CD = to 'A' or "P": set all records to "G" |
| PT-COL-CR-DATE-CD | PREFPAYRFLG, CPREFO, PREFPAYRADJ | If pt-col-level-cd = P and pt-col-auto-cd = 3 move 'Y' or with value = 'C' or 'E' move 'N' |
| PT-COL-DR-DATE-CD | PREFPAYRFLG, CPREFO, PREFPAYRADJ | If pt-col-level-cd = P and pt-col-auto-cd = 3 move 'Y' or with value = 'C' or 'E' move 'N' |
| PT-COL-DA-POINT | SETLACCTTYP | If PT-COL-LEVEL-CD = to 'P' and PT-COL-DA-POINT = '9GL' or PT_COL_DA_APPL_ID = COLLECTGL move 'GL<br>If PT-COL-LEVEL-CD = to 'A' and CA_SETT-DA-POINT= '9GL' or CA_SETT_DA_APPL_ID = COLLECTGL move 'GL<br>Else Move DDA |
| PT-COL-TR | RTTRNNBRCSETL | If CA-SETT-REDIST-CD= P move PT-COL-TR as is.<br>If PT-COL-LEVEL-CD = P move PT-COL-TR as is |
| PT-COL-ACCT | ACHACCTGNBRSETL | If PT-COL-LEVEL-CD = P and PT-COL-AUTO-CD = 3 or 8, take PT-COL-ACCT and move to ACHACCTNBRSETL and set CSTLV = F and set FILESETLFLG = Y |
| PT-COL-EXCP-ACCT | ACHACCTGNBRSETL | If CA-SETT-REDIST-CD= P move PT-COL-EXCP-ACCT as is unless null or spaces, then move CA-SETT-EXCP-ACCT as is. |
| PT-USER-AREA-CD6 | CSENDT | If 'T' move 11, If 'V' move 55 all others are 00 |
| PT-USER-AREA-CD7 | TXMTTYPE | If value = 'T' move 'V' if value 'A' move 'A' |
| PT-DT-ADDED | DSETUP | Move first 8 positions CCYYMMDD will only display 2 position for YY |
| PT-DT-LAST-FM | DLCHG3 | SPLIT field into Date CCYYMMDD, and time pieces and move as is. Will only display year 2 position for YY |
| PT-DT-LAST-FM | LSTCHGTIME | SPLIT field into Date CCYYMMDD, and time pieces and move as is. Will only display year 2 position for YY |
| PT-DT-LAST-FM | DTIME | CCYYMMDDHHMMSSFFFFFF |
| PT-DT-LAST-FM | SETL/DTIME | If PT-COL-LEVEL-CD = to 'P' move PT-DT-LAST-FM (DB2 Time Stamp format) |
| PT-SRCH-BEG-POS | FALTF | If PT-SRCH-BEG POS = or > 14 and < or = 23 then move PT-SRCH-TEXT |

TABLE 2-continued

| SOURCE DATA FIELD | TARGET DATA FIELD | INSTRUCTIONS |
|---|---|---|
| | | to ACHFILEID and set New Alt File Recognition Flag=N else set Alt File Recognition Flag to Y |
| PT-SRCH-BEG-POS | CALTR | If PT-SRCH-BEG POS < or = 94 then set NEW ALT FILE REC LEVEL=1, else 5 |
| PT-SRCH-BEG-POS | QALTS | if PT-SRCH-BEG-POS < or = 94 move as is, else PT-SRCH-BEG-POS minus 94 |
| PT-SRCH-TEXT-LEN | FALTF | If PT-SRCH-BEG POS = or > 14 and < or = 23 then move PT-SRCH-TEXT to ACHFILEID and set New Alt File Recognition Flag=N else set Alt File Recognition Flag to Y |
| PT-SRCH-TEXT | FALTF | If PT-SRCH-BEG POS = or > 14 and < or = 23 then move PT-SRCH-TEXT to ACHFILEID and set New Alt File Recognition Flag=N else set Alt File Recognition Flag to Y |
| PT-BYPASS-EPA-EDIT | FFBYP | If PT-BYPASS-EPA-EDIT = Y then set FFBYP=Y, else "N" |
| PT-RISK-TR | IRREL | Combine with PT-RISK-IDENTIFIER into field FILS/IRREL |
| PT-RISK-IDENTIFIER | IRREL | Combine with PT-RISK-TR into field FILS/IRREL |
| PT-SSI-AREA-CD14 | CHVAL | If PT-SSI-AREA-CD-14= P (priority), then move "H" to FILS/CHVAL else move "S" |
| PT-USER-AREA-CD19 | DCONV | Conversion wave indicator - Conversion process will pass date in CCYYMMDD based on this flag |
| CA-ADDR-LINE1 | COSHORTNME | Compress and take first 8 (non-blank characters) |
| CA-SETT-AUTO-CD | RTTRNNBRCSETL and ACHACCTNBRSETL and SETLACCTTYP | If PT_COL_LEVEL_CD = 'P' ignore if = 'A' and field = '3' or '8' take CA_SETT_TR and CA_SETT_ACCT and move to NA61 fields 18, 19, 20 |
| CA-SETT-PAPER-IN | CMICRC | If = 'Y' and CA_PAPER_DA_POINT is populated move 'Y' else move 'N' |
| CA-SETT-DA-POINT | ACCTTYP | If PT-COL-LEVEL-CD = to 'A' and CA_SETT-DA-POINT= '9**GL' or CA_SETT_DA_APPL_ID = COLLECTGL move 'GL Else Move DDA |
| CA-SETT-DA-TYPE | SETLACCTTYP | If PT-COL-LEVEL-CD = to 'A' and CA_SETT-DA-POINT= '9**GL' move 'GL ELSE: DDA |
| CA-SETT-TR | RTTRNNBRCSETL | If PT_COL_LEVEL_CD = A CA-SETT-TR as is. |
| CA-SETT-ACCT | ACHACCTNBRSETL | If PT_COL_LEVEL_CD = A move CA-SETT-ACCT as is. |
| CA-SETT-EXCP-ACCT | ACHACCTNBRSETL | RETN If PT_COL_LEVEL_CD = A or P move CA-SETT-EXCP-ACCT as is |
| CA-SETT-CR-BAS-OPT | PREFPAYRFLG, CPREFO, PREFPAYRADJ | If pt-col-level-cd = P ignore, if pt-col-level-cd = 'A' and ca_sett_auto_cd = 3 or 8 if ca-sett-auto-cd = 'C' or 'E' move 'N' on NA61 field 34, 35 and 36 If pt-col-level-cd = 'P' and ca-prefund-ind = 'Y' move 'Y' on NA61 field 34, move 'N' to field 35 and 36 |
| CA-REASSIGN-TRC-IN | COTRC | Retain trace retire original trace move to new field NA63 (O = origination only, R = returns, B = Both, I = none) if CA-RETIRED-TYPE = space and CA_REASSIGN_TRC_IN equal 'N' move 'B', if CA-RETIRED-TYPE = space and CA_REASSIGN_TRC_IN = 'Y' move 'R', |

TABLE 2-continued

| SOURCE DATA FIELD | TARGET DATA FIELD | INSTRUCTIONS |
|---|---|---|
| | | if CA-RETIRED-TYPE = 'RETST' and CA_REASSIGN_TRC_IN equal 'N' move 'O', if CA-RETIRED-TYPE = ' 'RETST' and CA_REASSIGN_TRC_IN equal 'Y' move 'I' |
| CA-TC-ID | FGLTR | If NACHA move "N", if NACHG, Move "I" (AI332) |
| CA-MAX-AMT-RUN | MBCAP, FBHLD | Move nines to MBCAP and Move 'N' to FBHLD |
| CA-MAX-AMT-ENTRY | MAXTRANAMT, FILEHOLDFLG | Move all nines to MAXTRANAMT Move 'N' to FILEHOLDFLG |
| CA-DET-DEL-IN | FIDEL | If value = 'R' move 'Y' to new field value else move 'N' - this is the return a delete as a return item |
| CA-RED-RET-REASON1 | RDEPTRNOPTN | If R18 do not convert |
| CA-RED-RET-REASON1 | CRETR | if CA-RED-RET-REASON1or CA-RED-RET-REASON2, or CA-RED-RET-REASON3 = R01 and CA-RED-RET-REASON1, CA-RED-RET-REASON2, or CA-RED-RET-REASON3 not equal to R09 then move "1" if CA-RED-RET-REASON1or CA-RED-RET-REASON2, or CA-RED-RET-REASON3 = R09 and CA-RED-RET-REASON1, CA-RED-RET-REASON2, or CA-RED-RET-REASON3 not equal to R01 then move "9" if CA-RED-RET-REASON1or CA-RED-RET-REASON2, or CA-RED-RET-REASON3 = R01 and R09 then move "B" CA-RED-RET-REASON1and CA-RED-RET-REASON2, and CA-RED-RET-REASON3 not equal to R01 or R09 then move "N" |
| CA-RED-RET-REASON2 | RDEPTRNOPTN | If R18 do not convert if CA-RED-RET-REASON1 or CA-RED-RET-REASON2, or CA-RED-RET-REASON3 = R01 and CA-RED-RET-REASON1, CA-RED-RET-REASON2, or CA-RED-RET-REASON3 not equal to R09 then move "1" if CA-RED-RET-REASON1or CA-RED-RET-REASON2, or CA-RED-RET-REASON3 = R09 and CA-RED-RET-REASON1, CA-RED-RET-REASON2, or CA-RED-RET-REASON3 not equal to R01 then move "9" if CA-RED-RET-REASON1or CA-RED-RET-REASON2, or CA-RED-RET-REASON3 = R01 and R09 then move "B" CA-RED-RET-REASON1and CA-RED-RET-REASON2, and CA-RED-RET-REASON3 not equal to R01 or R09 then move "N" |
| CA-RED-RET-REASON3 | RDEPTRNOPTN | If R18 do not convert if CA-RED-RET-REASON1or CA-RED-RET-REASON2, or CA-RED-RET-REASON3 = R01 and CA-RED-RET-REASON1, CA-RED-RET-REASON2, or CA-RED-RET-REASON3 not equal to R09 then move "1" if CA-RED-RET-REASON1or CA-RED-RET-REASON2, or CA-RED-RET-REASON3 = R09 and CA-RED-RET-REASON1, CA-RED-RET-REASON2, or CA-RED-RET-REASON3 not equal to R01 then move "9" if CA-RED-RET-REASON1or CA-RED-RET-REASON2, or CA-RED-RET-REASON3 = R01 and R09 then move "B" |

TABLE 2-continued

| SOURCE DATA FIELD | TARGET DATA FIELD | INSTRUCTIONS |
|---|---|---|
| CA-RETIRED-TYPE | COTRC | CA-RED-RET-REASON1 and CA-RED-RET-REASON2, and CA-RED-RET-REASON3 not equal to R01 or R09 then move "N" Retain trace retire original trace move to new field NA63 (O = origination only, R = returns, B = Both, I = none) if CA-RETIRED-TYPE = space and CA_REASSIGN_TRC_IN equal 'N' move 'B', if CA-RETIRED-TYPE = space and CA_REASSIGN_TRC_IN = 'Y' move 'R', if CA-RETIRED-TYPE = 'RETST' and CA_REASSIGN_TRC_IN equal 'N' move 'O', if CA-RETIRED-TYPE = ' 'RETST' and CA_REASSIGN_TRC_IN equal 'Y' move 'I' |
| CA-USER-AREA-CD4 | FDLAY | If = 'Y' set to "Y" else '"N" |
| CA-USER-AREA-CD5 | FFBYP | If value = 'B' Move 'Y' to new bypass Fraud Filter processing else "N" - AI 267 Could make this mapping as Do not convert |
| CA-USER-AREA-CD6 | CSENDT | If 'I' move 11, If 'V' move 55 all others are 00 |
| CA-USER-AREA-CD7 | CSTLV | If PT_COL_LEVEL_CD = A and CA-USER-AREA-CD7 = I: set value to I<br>If PT_COL_LEVEL_CD = A and CA-SSI-AREA-CD11 <> F or B and CA-USER-AREA-CD7 <> I: set value to C<br>RETN<br>If PT_COL_LEVEL_CD = A or P and CA-USER-AREA-CD7 = I: set value to I<br>Else: "C" |
| CA-USER-AREA-CD9 | FEXMP | Greater than space, move "Y", else move "N" |
| CA-SSI-AREA-CD2 | CSTLV | If "I", move "I" else move "C" |
| CA-SSI-AREA-CD9 | PREFPAYRFLG | If CA-SSI-AREA-CD9=M then PREFPAYFLAG=Y. PT-COL-LEVEL-CD= P AND PT-COL-AUTO-CD = 3 or 8 AND (PT-COL-CR-DATE-CD or PT-COL-DT-DATE-CD) = C or E then set PREFPAYRFLAG=N (also set CPREFO and PREFPAYRADJ=N) If CA_SETT-AUTO-CD=3 or 8 and (CA-SETT-CR-BAS-OPT or CA-SETT-DR-BAS-OPT) =C or E then PREFPAYRFLG=N, otherwise PREFPAYRFLG=Y. If CA-PREFUND-IND is Y move Y into PREFPAYRFLG. |
| CA-DT-ADDED | DSETUP | Move first 8 bytes format YYYYMMDD |
| CA-DT-LAST-FM | DLCHG3 | Split field move in Time and date |
| CA-DT-LAST-FM | LASTCHGTIME | Split field move in Time and date |
| CA-DT-LAST-FM | CPNY/DTIME | Split field move in Time and date |
| CA-DT-LAST-FM | SETL/DTIME | if PT-COL-LEVEL-CD = to 'A' move CA-DT-LAST-FM (DB2 Time Stamp format) |
| CA-RISK-TR-A | IRISK | Combine CA-RISK-IDENTIFIER + CA-RISK-TR-A fields |
| CA-RISK-IDENTIFIER | IRISK | Combine CA-RISK-IDENTIFIER + CA-RISK-TR-A fields |
| CA-EFFDATE-NON-BUS | DATEFOREBACK | If B, move B, else move F |

TABLE 2-continued

| SOURCE DATA FIELD | TARGET DATA FIELD | INSTRUCTIONS |
|---|---|---|
| CA-SETT-REDIST-CD | SETLACCTTYP | If CA-SETT-REDIST-CD= R, S or E and CA-SETT-DA-POINT = '9GL' move 'GL' if CA-SETT-REDIST-CD= P and PT-COL-DA-POINT = '9GL' move 'GL Else Move DDA |
| CA-SETT-REDIST-CD | RTNFLOATBYP | If CA-SETT-REDIST-CD= R, S, E or P then CPNY/FFLOT = N else Y. |
| CA-SETT-REDIST-CD | ACHCOID | REDP IF PT-COL-LEVEL-CD = A or P and CA-SETT-REDIST-CD equal to R, S, E, or P move CA-COMP-ID as is |
| CA-SETT-REDIST-CD | CSTLTY | If CA-SETT-REDIST-CD= R, S, E, P: set value to REDP |
| CA-SETT-REDIST-CD | CSTLVL | if CA-SETT-REDIST-CD equal to S, E, or P and CA-USER-AREA-CD7 = I: set value to I , else if CA-SETT-REDIST-CD equal to R, S, E, or P and CA-USER-AREA-CD7 <> I: set value to C |
| CA-SETT-REDIST-CD | RTTRNNBRCSETL | If CA-SETT-REDIST-CD= R, S or E move CA-SETT-TR as is. |
| CA-SETT-REDIST-CD | ACHACCTNBRSETL | If CA-SETT-REDIST-CD= P move PT-COL-TR as is. If CA-SETT-REDIST-CD= R move CA_SETT_RED_ACCT as is. If CA-SETT-REDIST-CD= S move CA-SETT-ACCT as is. if CA-SETT-REDIST-CD= E move CA-SETT-EXCP-ACCT as is. If CA-SETT-REDIST-CD= P move PT-COL-EXCP-ACCT as is unless null or spaces, then move CA-SETT-EXCP-ACCT as is. |
| CA-SETT-REDIST-CD Continued | SETLOPTNCDE | If CA-SETT-REDIST-CD= R, S, E, P: set all records to "G" |
| CA-SETT-REDIST-CD Continued | LSTCHGID | If CA-SETT-REDIST-CD= R, S, E, P: set all as "CONVERT" |
| CA-SETT-REDIST-CD Continued | NLCHG | If CA-SETT-REDIST-CD= R, S, E, P: set all as "CONVERT" |
| CA-DISHONOR-DAYS | DISPRNTNFLG | If CA-DISHONOR DAYS is null or zeroes then DISPRTNFLG=1, otherwise 4 |
| CA-DISHONOR-DAYS | NBRRTNHSTDAYS | If CA-DISHONOR DAYS is null or zero move zeros else calculate as CA-DISHONOR-DAYS less 2. |
| CA-REDIST-LAG-DAYS | ACHWINDOWRDEP CWNDR2 | If CA-REDIST-LAG-DAYS is 5 or less, move as is, else move as CA-REDIST-LAG-DAYS less 2 (to adjust from calendar to business days) |
| CA-USER-AREA-CD11 | CRETD | AI 433 - Return Reporting in conjunction with DA_DIST_DT_TODAY1 - 24 ORIG |
| CA-USER-AREA-CD11 | CSTLVL | If PT-COL-LEVEL-CD = P : set value to F If PT_COL_LEVEL_CD = A and CA-USER-AREA-CD7 = I: set value to I If PT_COL_LEVEL_CD = A and CA-SSI-AREA-CD11 <> F or B and CA-USER-AREA-CD7 <> I: set value to C If PT_COL_LEVEL_CD = A and CA-SSI-AREA-CD11= B: set value to B If PT_COL_LEVEL_CD = A and CA-SSI-AREA-CD11= F: set value to Z |
| CA-USER-AREA-CD14 | CHVAL | If CA-SSI-AREA-CD14= P (priority), then move "H" to CHVAL else move "S" |
| CA-SSI-AREA-CD11 | CSTLV | See CA-USER-AREA-CD7 (If "I", move "I") If B, move "X" |

TABLE 2-continued

| SOURCE DATA FIELD | TARGET DATA FIELD | INSTRUCTIONS |
|---|---|---|
| CA-SSI-AREA-CD13 | CDUPB | If space, move "B", If F, move "C" if CA-SSI-AREA-CD13 is blank (null) = "N", if 'D" = R, else as is |
| CA-RED-ADMIN-IND | FADMRT | If PT-POINT-TYPE-CD=R or S, then move as is CA-RED-ADMIN-IND to FADMRT, else "N" - changed |
| CA-PREFUND-IND | PREFPAYRFLG | If CA-PREFUND-IND = 'Y' move 'Y' to PREFPAYRFLG |
| CA-PREFUND-IND | CPREFO | If CA-PREFUND-IND = 'Y' move 'N' to CPREFO |
| CA-PREFUND-IND | PREFPAYRADJ | If CA-PREFUND-IND = 'Y' move 'N' to PREFPAYRADJ |
| CA-SETT-RED-ACCT | TRACT | If CA-SETT-REDIST-CD=R then CPNY/TRACT = CA-SETT-RED-ACCT else, if CA-SETT-REDIST-CD=S then CPNY/TRACT=CA-SETT-ACCT, else if CA-SETT-REDIST-CD=E then CPNY/TRACT=CA-SETT-EXCP-ACCT, else if CA-SETT-REDIST-CD=P and CA-SETT-EXCP-ACCT not null CPNY/TRACT= CA-SETT-ACCT); else if CA-SETT-EXCP-ACCT is null CPNY/TRACT =CA-SETT-ACCT. |
| CA-SEC-RECOG-ID | ACHFILEID | If CA-SEC-RECOG-ID > NULL, build TSEC segment. (assumes file setup is done before this segment is converted). |
| CA-SEC-RECOG-ID | FSECV | If CA-SEC-RECOG-ID > Null (space) then move "Y" here |
| CA-SEC-RECOG-ID | FSECDF | If CA-SEC-RECOG-ID is Null then move "Y" here. <further rules to be defined for when CA-SEC-RECOG-ID > null |
| RCA-TRAN-CR-LMT-A | MIMXC | Move as is, else if spaces, move 9's Tran Credit Limit - RCA-TRAN-PROC-OPT = "N" |
| RCA-TRAN-CR-LMT-A | FILEHOLDFLG | If both RCA-TRAN-CR-LMT-A and RCA-TRAN-DT-LMT-A are spaces then Y else N. |
| RCA-TRAN-CR-LMT-A | MAXTRANAMT | If both RCA-TRAN-CR-LMT-A and RCA-TRAN-DT-LMT-A > spaces then move the smaller of the two here, else if on RCA-TRAN-CR-LMT-A > spaces move RCA-TRAN-CR-LMT-A here, else if RCA-TRAN-DT-LMT-A is > spaces move RCA-TRAN-DT-LMT here. (Use CA-RISK-TR-A and CA-RISK-IDENTIFIER to tie it back to the company id) |
| RCA-TRAN-PROC-OPT | CIMXC | If space, move "N", else Map as is |
| RCA-TRAN-PROC-OPT | CIMXD | If space, move "N", else Map as is |
| RCA-FILE-CR-LMT-A | MFMXC if RCA Edit Level =F (move 9's MBMXC) MBMXC if RCA Edit Level =B (move 9's MFMXC) | If RCA Edit Level = F, move as is to MFMXC and move all 9's to MBMXC If null, move all 9's to MFMXC and move "N" to CFMXC, else move RCA-FILE-PROC-OPT as is If RCA Edit Level = B, move as is to MBMXC and move all 9's to MFMXC If null, move all 9's to MBMXC and move "N" to CBMXC, else move RCA-FILE-PROC-OPT as is |
| RCA-FILE-DR-LMT-A | MFMXD if RCA Edit Level =F (move 9's MBMXD) MBMXD if RCA Edit Level =B | If RCA-EDIT-LEVE:L=F then "N" else If RCA-EDIT-LEVEL=B then move RCA-FILE-PROC-OPTION to SPRO/CBMXD as is unless Null (or space) then move "N" |

TABLE 2-continued

| SOURCE DATA FIELD | TARGET DATA FIELD | INSTRUCTIONS |
|---|---|---|
| | (move 9's MFMXD) | |
| RCA-EDIT-LEVEL | MFMXD | See RCA-FILE-DR-LMT-A and RCA-FILE-CR-LMT-A Rules |
| RCA-EDIT-LEVEL | MBMXD | See RCA-FILE-DR-LMT-A and RCA-FILE-CR-LMT-A Rules |
| RCA-EDIT-LEVEL | MFMXC | See RCA-FILE-DR-LMT-A and RCA-FILE-CR-LMT-A Rules |
| RCA-EDIT-LEVEL | MBMXC | See RCA-FILE-DR-LMT-A and RCA-FILE-CR-LMT-A Rules |
| RCA-FILE-PROC-OPT | CFMXD | See RCA-FILE-DR-LMT-A and RCA-FILE-CR-LMT-A Rules |
| RCA-FILE-PROC-OPT | CBMXD | See RCA-FILE-DR-LMT-A and RCA-FILE-CR-LMT-A Rules |
| RCA-FILE-PROC-OPT | CFMXC | See RCA-FILE-DR-LMT-A and RCA-FILE-CR-LMT-A Rules |
| RCA-FILE-PROC-OPT | CBMXC | See RCA-FILE-DR-LMT-A and RCA-FILE-CR-LMT-A Rules |
| PA-ID | ICOID | If PA-RECOG-CD=1,2,3,4 or 5 then move PA-ID as is to ERPS/ICOID |
| PA-DESC | TPREC | If PA-RECOG-CD=3, 4, or 5 then move PA-DESC as is to ERPS/TPREC |
| PA-SEC | CPSEC | if Recognition Code is 5. The value in this field is compared to the STANDARD ENTRY CLASS field in the batch header of an incoming entry |
| PA-RECOG-CODE | CPRRC | Matching Criteria:<br>'0' No recognition - PA may be assigned directly on the CA or through the Process Application<br>'1' Company ID.<br>'2' Company ID, Name<br>'3' Company ID, Name, Description.<br>'4' Company ID, Name, Description, T/R number.<br>'5' Company ID, Name, Description, T/R number, Standard Entry Class.<br>'6' Account number, T/R number.<br>'7' Sub-Account number, T/R number<br>If PA-CR-SUMMARY-IN=Y then map as CPRRC as 10 else map PA-RECOG-CODE to CPRRC as is |
| PA-RECOG-CODE | QSPOS | Matching Criteria:<br>'0' No recognition - PA may be assigned directly on the CA or through the Process Application<br>'1' Company ID.<br>'2' Company ID, Name<br>'3" Company ID, Name, Description.<br>'4' Company ID, Name, Description, T/R number.<br>'5' Company ID, Name, Description, T/R number, Standard Entry Class.<br>'6' Account number, T/R number.<br>'7' Sub-Account number, T/R number<br>If PA-RECOG-CD= 7 then take the Subaccount PA-RECOG-TR value and look on the FIM table and map FI-SUB-BEG-POS to QSPOS as is. |
| PA-RECOG-CODE | QSLEN | Matching Criteria:<br>'0' No recognition - PA may be assigned directly on the CA or through the Process Application<br>'1' Company ID.<br>'2' Company ID, Name<br>'3' Company ID, Name, Description.<br>'4' Company ID, Name, Description, T/R number.<br>'5' Company ID, Name, |

TABLE 2-continued

| SOURCE DATA FIELD | TARGET DATA FIELD | INSTRUCTIONS |
|---|---|---|
| | | Description, T/R number, Standard Entry Class. '6' Account number, T/R number. '7' Sub-Account number, T/R number If PA-RECOG-CD= 7 then (take the Subaccount PA-RECOG-TR value and look on the FIM table and map FI-SUB-LENGTH to QSLEN as is. |
| PA-RECOG-TR | IRCRT | if Recognition Code is 6 or 7 Move value to IRCRT |
| PA-RECOG-ACCT | IRCAC | if Recognition Code is 6 or 7 Move value to IRCAC |
| FI-TR | RTTRNNBRC | If FI-DA-DEF-TR-CD = 0 or 1 move as is, else do not convert |
| FI-TR | ABANBR | If FI-DA-DEF-TR-CD = 0, 1 or 2 move 6 digit converted ABA #, else do not convert |
| FI-TR | RTTRNNBRC1 | If FI-DA-DEF-TR-CD= 0, 1 or 2 then move FI-TR to RTBL/ RTTRNNBRC1 |
| FI-TR | RTTRNNBRC | If FI-DA-DEF-TR-CD = 0, 1 or 2 move as is, else do not convert |
| FI-NAME | BANKNAME | If FI-DA-DEF-TR-CD = 0 or 1 move as is, else do not convert |
| FI-NAME | ALTBNKNME | If FI-DA-DEF-TR-CD= 0, 1, 2 then move FI-NAME as is to ALTBNKNME |
| FI-DA-DEF-TR-CD | ALT RT SWAP INDICATOR | If FI-DA-DEF-TR-CD = 1, move "N', if = 2, move "Y", else do not covert |
| FI-SUB-BEG-POS | QSPOS | If PA-RECOG-CD= 7 then take the Subaccount PA-RECOG-TR value and look on the FIM table and map FI-SUB-BEG-POS to ERPS/QSPOS as is. |
| FI-SUB-LENGTH | QSLEN | If PA-RECOG-CD= 7 then (take the Subaccount PA-RECOG-TR value and look on the FIM table and map FI-SUB-LENGTH to ERPS/QSLEN as is. |
| FI-SSI-AREA-CD1 | FANOC | if equal blank set value to "N" if "A" set value to "Y" |
| FI-DT-ADDED | EFCTDTE8 | BAC field currently has date and time, need to only move date. Format is CCYYMMDD |
| FI-DT-LAST-MAINT | DTIME | CCYYMMDDHHMMSSFFFFF - where F = fraction of seconds |
| FI-DT-LAST-MAINT | LASTCHGDTE | Move Spaces |
| SEC_INC_EXC_IND | FINCL | If SEC_INC_EXC_IND= I then move "I". If X set to "E". |
| SEC_DT_ADDED | DEFFC | Move Conversion Date |

In operation, application 195 converts ACH data 135 stored in source database 145 to converted ACH data 140 using ACH data conversion rules 150 such as the ACH data conversion rules shown in TABLE 2 above. As previously described, application 195 analyzes ACH data conversion rules 150 in order to determine the source data field 210, the target data field 220, and the conversion instructions 230 of each ACH data conversion rule 150. After determining the source data field 210, the target data field 220, and the conversion instructions 230, application 195 receives ACH data 135 from the determined source data field 210 of source database 145. Next, application 195 converts the received ACH data 145 into converted ACH data 140 according to the determined conversion instructions 230. Finally, application 195 may store converted ACH data 140 in the determined target data field 220 of target database 155.

FIG. 3 illustrates one embodiment of a method 300 for converting ACH data 135 into converted ACH data 140 as described above. Method 300 may be implemented, for example, by application 195 in server 130. Method 300 begins in step 310 where a plurality of ACH data conversion rules are determined. In some embodiments, the plurality of ACH data conversion rules may be ACH data conversion rules 150 described above.

In step 320, a source data field, a target data field, and conversion instructions are determined from the ACH data conversion rules of step 310. In certain embodiments, for example, the determined source data field may refer to source data field 210 described above. In certain embodiments, the determined target data field may refer to target data field 220 described above. In certain embodiments, the determined conversion instructions may refer to conversion instructions 230 described above.

In step 330, ACH data is received from the determined source data field of the source database. In certain embodiments, the source database may refer to source database 145 described above.

In step 340, it is determined whether the ACH data received in step 330 needs to be converted. For example, the determined conversion instructions of step 320 may indicate whether or not to convert the received ACH data depending on the value of the ACH data. If it is determined in step 340 that the ACH data received in step 330 needs to be converted, method 300 proceeds to step 350. Otherwise, method 300 ends.

In step 350, the ACH data received in step 330 is converted into converted ACH data according to the determined conversion rules. In certain embodiments, the converted ACH data may refer to converted ACH data 140 described above.

In step 360, the converted ACH data of step 350 is stored in the target database in the determined target data field of step 320. In certain embodiments, the target database may refer to target database 155 described above.

Although the present invention has been described in detail, it should be understood that various changes, substitutions, and alterations can be made hereto without departing from the scope of the invention as defined by the appended claims.

What is claimed is:

1. A server, comprising:
   a source database comprising a plurality of source data fields;
   a target database comprising a plurality of target data fields;
   a memory storing a plurality of automated clearing house (ACH) data conversion rules, each of the plurality of ACH data conversion rules comprising:
   a name associated with a source data field of the source database;
   a name associated with a target data field of the target database; and
   an instruction indicating how to convert ACH data in the source data field into converted ACH data to be stored in the target data field; and
   a processor communicatively coupled to the memory, the source database, and the target database, the processor utilizing the ACH data conversion rules to:
   convert ACH data from the source database into converted ACH data according to the ACH data conversion rules; and
   store the converted ACH data in the target database.

2. The server of claim 1, wherein the converting ACH data into converted ACH data according to the ACH data conversion rules comprises:
   determining the plurality of ACH data conversion rules; and
   performing the following for each of the plurality of ACH data conversion rules:
   determining the source data field, the target data field, and the instruction of the ACH data conversion rule;
   receiving ACH data from the determined source data field of the source database; and
   converting the received ACH data into converted ACH data according to the determined instruction.

3. The server of claim 2, wherein storing the converted ACH data in the target database comprises storing the converted ACH data in the determined target data field of the target database.

4. The server of claim 1, wherein the plurality of target data fields of the target database comprises the following names:
   FILESOURCE;
   RTTRNNBRCSETL;
   FALTF;
   CALTR;
   QALTS;
   RDEPTRNOPTN;
   CRETR;
   SETLACCTTYP;
   RTNFLOATBYP;
   ACHCOID;
   CSTLTY;
   CSTLVL;
   RTTRNNBRCSETL; and
   ACHACCTNBRSETL.

5. The server of claim 1, wherein the plurality of ACH data conversion rules comprises a selected one of the following:
   a first ACH data conversion rule comprising a source data field of "PT-POINT-TYPE-CD", a target data field of "FILESOURCE", and an instruction comprising "If PT-POINT-TYPE-CD C, B, R, S move 2, If PT-POINT-TYPE-CD A=move 1";
   a second ACH data conversion rule comprising a source data field of "PT-COL-LEVEL-CD", a target data field of "RTTRNNBRCSETL", and an instruction comprising "If PT-COL-LEVEL-CD=P move PT-COL-TR as is; if PT_COL_LEVEL_CD=A move CA-SETT-TR as is;
   a third ACH data conversion rule comprising a source data field of "PT-SRCH-BEG-POS", a target data field of "FALTF", and an instruction comprising "If PT-SRCH-BEG POS= or >14 and < or =23 then move PT-SRCH-TEXT to ACHFILEID and set New Alt File Recognition Flag=N else set Alt File Recognition Flag to Y";
   a fourth ACH data conversion rule comprising a source data field of "PT-SRCH-BEG-POS", a target data field of "CALTR", and an instruction comprising "If PT-SRCH-BEG POS< or =94 then set NEW ALT FILE REC LEVEL=1, else 5";
   a fifth ACH data conversion rule comprising a source data field of "PT-SRCH-BEG-POS", a target data field of "QALTS", and an instruction comprising "if PT-SRCH-BEG-POS< or =94 move as is, else PT-SRCH-BEG-POS minus 94";
   a sixth ACH data conversion rule comprising a source data field of "CA-RED-RET-REASON1", a target data field of "RDEPTRNOPTN", and an instruction comprising "If R18 do not convert";
   a seventh ACH data conversion rule comprising a source data field of "CA-RED-RET-REASON1", a target data field of "CRETR", and an instruction comprising "if CA-RED-RET-REASON1 or CA-RED-RET-REASON2, or CA-RED-RET-REASON3=R01 and CA-RED-RET-REASON1, CA-RED-RET-REASON2, or CA-RED-RET-REASON3 not equal to R09 then move "1"; if CA-RED-RET-REASON1 or CA-RED-RET-REASON2, or CA-RED-RET-REASON3=R09 and CA-RED-RET-REASON1, CA-RED-RET-REASON2, or CA-RED-RET-REASON3 not equal to R01 then move "9"; if CA-RED-RET-REASON1 or CA-RED-RET-REASON2, or CA-RED-RET-REASON3=R01 and R09 then move "B"; CA-RED-RET-REASON1 and CA-RED-RET-REASON2, and CA-RED-RET-REASON3 not equal to R01 or R09 then move "N"";
   an eight ACH data conversion rule comprising a source data field of "CA-SETT-REDIST-CD", a target data field of "SETLACCTTYP", and an instruction comprising "If CA-SETT-REDIST-CD=R, S or E and CA-SETT-DA-POINT='9GL' move 'GL; if CA-SETT-REDIST-CD=P and PT-COL-DA-POINT='9GL' move 'GL; Else Move DDA";

a ninth ACH data conversion rule comprising a source data field of "CA-SETT-REDIST-CD", a target data field of "RTNFLOATBYP", and an instruction comprising "If CA-SETT-REDIST-CD=R, S, E or P then CPNY/FFLOT=N else Y";

a tenth ACH data conversion rule comprising a source data field of "CA-SETT-REDIST-CD", a target data field of "ACHCOID", and an instruction comprising "REDP; IF PT-COL-LEVEL-CD=A or P and CA-SETT-REDIST-CD equal to R, S, E, or P move CA-COMP-ID as is";

an eleventh ACH data conversion rule comprising a source data field of "CA-SETT-REDIST-CD", a target data field of "CSTLTY", and an instruction comprising "If CA-SETT-REDIST-CD=R, S, E, P: set value to REDP";

a twelfth ACH data conversion rule comprising a source data field of "CA-SETT-REDIST-CD", a target data field of "CSTLVL", and an instruction comprising "if CA-SETT-REDIST-CD equal to S, E, or P and CA-USER-AREA-CD7=I: set value to I, else if CA-SETT-REDIST-CD equal to R, S, E, or P and CA-USER-AREA-CD7<>I: set value to C";

a thirteenth ACH data conversion rule comprising a source data field of "CA-SETT-REDIST-CD", a target data field of "RTTRNNBRCSETL", and an instruction comprising "If CA-SETT-REDIST-CD=R, S or E move CA-SETT-TR as is"; and a fourteenth ACH data conversion rule comprising a source data field of "CA-SETT-REDIST-CD", a target data field of "ACHACCTNBRSETL", and an instruction comprising "If CA-SETT-REDIST-CD=P move PT-COL-TR as is; If CA-SETT-REDIST-CD=R move CA_SETT_RED_ACCT as is; If CA-SETT-REDIST-CD=S move CA-SETT-ACCT as is; if CA-SETT-REDIST-CD=E move CA-SETT-EXCP-ACCT as is; If CA-SETT-REDIST-CD=P move PT-COL-EXCP-ACCT as is unless null or spaces, then move CA-SETT-EXCP-ACCT as is".

6. The server of claim 1, wherein the processor is further operable to:
receive the ACH data from a plurality of clients;
store the received ACH data in the source database; and
determine, based on the ACH data conversion rules, whether the ACH data needs to be converted.

7. A method comprising:
determining by a computing system a plurality of automated clearing house (ACH) data conversion rules, each of the plurality of ACH data conversion rules comprising:
a name associated with a source data field of a source database;
a name associated with a target data field of a target database; and
an instruction indicating how to convert ACH data in the source data field into converted ACH data to be stored in the target data field;
converting by the computing system ACH data from the source database into converted ACH data according to the determined ACH data conversion rules; and
storing by the computing system the converted ACH data in the target database.

8. The method of claim 7, wherein the converting ACH data into converted ACH data according to the determined ACH data conversion rules comprises performing the following for each of the determined ACH data conversion rules:
determining the source data field, the target data field, and the instruction of the ACH data conversion rule; and
receiving ACH data from the determined source data field of the source database; and
converting the received ACH data into converted ACH data according to the determined instruction.

9. The method of claim 8, wherein storing the converted ACH data in the target database comprises storing the converted ACH data in the determined target data field of the target database.

10. The method of claim 7, wherein the plurality of target data fields of the target database comprises the following names:
FILESOURCE;
RTTRNNBRCSETL;
FALTF;
CALTR;
QALTS;
RDEPTRNOPTN;
CRETR;
SETLACCTTYP;
RTNFLOATBYP;
ACHCOID;
CSTLTY;
CSTLVL;
RTTRNNBRCSETL; and
ACHACCTNBRSETL.

11. The method of claim 7, wherein the plurality of ACH data conversion rules comprises a selected one of the following:
a first ACH data conversion rule comprising a source data field of "PT-POINT-TYPE-CD", a target data field of "FILESOURCE", and an instruction comprising "If PT-POINT-TYPE-CD C, B, R, S move 2, If PT-POINT-TYPE-CD A=move 1";

a second ACH data conversion rule comprising a source data field of "PT-COL-LEVEL-CD", a target data field of "RTTRNNBRCSETL", and an instruction comprising "If PT-COL-LEVEL-CD=P move PT-COL-TR as is; if PT_COL_LEVEL_CD=A move CA-SETT-TR as is;

a third ACH data conversion rule comprising a source data field of "PT-SRCH-BEG-POS", a target data field of "FALTF", and an instruction comprising "If PT-SRCH-BEG POS= or >14 and < or =23 then move PT-SRCH-TEXT to ACHFILEID and set New Alt File Recognition Flag=N else set Alt File Recognition Flag to Y";

a fourth ACH data conversion rule comprising a source data field of "PT-SRCH-BEG-POS", a target data field of "CALTR", and an instruction comprising "If PT-SRCH-BEG POS< or =94 then set NEW ALT FILE REC LEVEL=1, else 5";

a fifth ACH data conversion rule comprising a source data field of "PT-SRCH-BEG-POS", a target data field of "QALTS", and an instruction comprising "if PT-SRCH-BEG-POS< or =94 move as is, else PT-SRCH-BEG-POS minus 94";

a sixth ACH data conversion rule comprising a source data field of "CA-RED-RET-REASON1", a target data field of "RDEPTRNOPTN", and an instruction comprising "If R18 do not convert";

a seventh ACH data conversion rule comprising a source data field of "CA-RED-RET-REASON1", a target data field of "CRETR", and an instruction comprising "if CA-RED-RET-REASON1 or CA-RED-RET-REASON2, or CA-RED-RET-REASON3=R01 and CA-RED-RET-REASON1, CA-RED-RET-REASON2, or CA-RED-RET-REASON3 not equal to R09 then move "1"; if CA-RED-RET-REASON1 or CA- RED-RET-REASON2, or CA-RED-RET-REASON3=R09 and CA-RED-RET-REASON1, CA-RED-RET-REASON2, or CA-RED-RET-REASON3 not equal to R01 then move "9"; if CA-RED-RET-REASON1 or CA-RED-RET-REASON2, or CA-RED-RET-REASON3=R01 and R09 then move "B"; CA-RED-RET-REASON1 and CA-RED-RET-REASON2, and CA-RED-RET-REASON3 not equal to R01 or R09 then move "N"";

an eight ACH data conversion rule comprising a source data field of "CA-SETT-REDIST-CD", a target data field of "SETLACCTTYP", and an instruction comprising "If CA-SETT-REDIST-CD=R, S or E and CA-SETT-DA-POINT='9GL' move 'GL; if CA-SETT-REDIST-CD=P and PT-COL-DA-POINT='9GL' move 'GL; Else Move DDA'";

a ninth ACH data conversion rule comprising a source data field of "CA-SETT-REDIST-CD", a target data field of "RTNFLOATBYP", and an instruction comprising "If CA-SETT-REDIST-CD=R, S, E or P then CPNY/FFLOT=N else Y";

a tenth ACH data conversion rule comprising a source data field of "CA-SETT-REDIST-CD", a target data field of "ACHCOID", and an instruction comprising "REDP; IF PT-COL-LEVEL-CD=A or P and CA-SETT-REDIST-CD equal to R, S, E, or P move CA-COMP-ID as is";

an eleventh ACH data conversion rule comprising a source data field of "CA-SETT-REDIST-CD", a target data field of "CSTLTY", and an instruction comprising "If CA-SETT-REDIST-CD=R, S, E, P: set value to REDP";

a twelfth ACH data conversion rule comprising a source data field of "CA-SETT-REDIST-CD", a target data field of "CSTLVL", and an instruction comprising "if CA-SETT-REDIST-CD equal to S, E, or P and CA-USER-AREA-CD7=I: set value to I, else if CA-SETT-REDIST-CD equal to R, S, E, or P and CA-USER-AREA-CD7<>I: set value to C";

a thirteenth ACH data conversion rule comprising a source data field of "CA-SETT-REDIST-CD", a target data field of "RTTRNNBRCSETL", and an instruction comprising "If CA-SETT-REDIST-CD=R, S or E move CA-SETT-TR as is"; and a fourteenth ACH data conversion rule comprising a source data field of "CA-SETT-REDIST-CD", a target data field of "ACHACCTNBRSETL", and an instruction comprising "If CA-SETT-REDIST-CD=P move PT-COL-TR as is; If CA-SETT-REDIST-CD=R move CA_SETT_RED_ACCT as is; If CA-SETT-REDIST-CD=S move CA-SETT-ACCT as is; if CA-SETT-REDIST-CD=E move CA-SETT-EXCP-ACCT as is; If CA-SETT-REDIST-CD=P move PT-COL-EXCP-ACCT as is unless null or spaces, then move CA-SETT-EXCP-ACCT as is".

12. A system, comprising:
a client operable to communicate automated clearing house (ACH) data;
a source database comprising a plurality of source data fields;
a target database comprising a plurality of target data fields; and
a server communicatively coupled to the client, the source database, and the target database, the server comprising:
a memory storing a plurality of automated clearing house (ACH) data conversion rules, each of the plurality of ACH data conversion rules comprising:
a name associated with a source data field of the source database;
a name associated with a target data field of the target database; and
an instruction indicating how to convert ACH data in the source data field into converted ACH data to be stored in the target data field; and
a processor communicatively coupled to the memory, the source database, and the target database, the processor utilizing the ACH data conversion rules to:
convert ACH data from the source database into converted ACH data according to the ACH data conversion rules; and
store the converted ACH data in the target database.

13. The system of claim 12, wherein the converting ACH data into converted ACH data according to the ACH data conversion rules comprises:
determining the plurality of ACH data conversion rules; and
performing the following for each of the plurality of ACH data conversion rules:
determining the source data field, the target data field, and the instruction of the ACH data conversion rule;
receiving ACH data from the determined source data field of the source database; and
converting the received ACH data into converted ACH data according to the determined instruction.

14. The system of claim 13, wherein storing the converted ACH data in the target database comprises storing the converted ACH data in the determined target data field of the target database.

15. The system of claim 12, wherein the plurality of target data fields of the target database comprises the following names:
FILESOURCE;
RTTRNNBRCSETL;
FALTF;
CALTR;
QALTS;
RDEPTRNOPTN;
CRETR;
SETLACCTTYP;
RTNFLOATBYP;
ACHCOID;
CSTLTY;
CSTLVL;
RTTRNNBRCSETL; and
ACHACCTNBRSETL.

16. The system of claim 12, wherein the plurality of ACH data conversion rules comprises a selected one of the following:
a first ACH data conversion rule comprising a source data field of "PT-POINT-TYPE-CD", a target data field of "FILESOURCE", and an instruction comprising "If PT-POINT-TYPE-CD C, B, R, S move 2, If PT-POINT-TYPE-CD A=move 1";
a second ACH data conversion rule comprising a source data field of "PT-COL-LEVEL-CD", a target data field of "RTTRNNBRCSETL", and an instruction comprising "If PT-COL-LEVEL-CD=P move PT-COL-TR as is; if PT_COL_LEVEL_CD=A move CA-SETT-TR as is;
a third ACH data conversion rule comprising a source data field of "PT-SRCH-BEG-POS", a target data field of "FALTF", and an instruction comprising "If PT-SRCH-BEG POS= or >14 and < or =23 then move PT-SRCH-TEXT to ACHFILEID and set New Alt File Recognition Flag=N else set Alt File Recognition Flag to Y";

a fourth ACH data conversion rule comprising a source data field of "PT-SRCH-BEG-POS", a target data field of "CALTR", and an instruction comprising "If PT-SRCH-BEG POS< or =94 then set NEW ALT FILE REC LEVEL=1, else 5";

a fifth ACH data conversion rule comprising a source data field of "PT-SRCH-BEG-POS", a target data field of "QALTS", and an instruction comprising "if PT-SRCH-BEG-POS< or =94 move as is, else PT-SRCH-BEG-POS minus 94";

a sixth ACH data conversion rule comprising a source data field of "CA-RED-RET-REASON1", a target data field of "RDEPTRNOPTN", and an instruction comprising "If R18 do not convert";

a seventh ACH data conversion rule comprising a source data field of "CA-RED-RET-REASON1", a target data field of "CRETR", and an instruction comprising "if CA-RED-RET-REASON1 or CA-RED-RET-REASON2, or CA-RED-RET-REASON3=R01 and CA-RED-RET-REASON1, CA-RED-RET-REASON2, or CA-RED-RET-REASON3 not equal to R09 then move "1"; if CA-RED-RET-REASON1 or CA-RED-RET-REASON2, or CA-RED-RET-REASON3=R09 and CA-RED-RET-REASON1, CA-RED-RET-REASON2, or CA-RED-RET-REASON3 not equal to R01 then move "9"; if CA-RED-RET-REASON1 or CA-RED-RET-REASON2, or CA-RED-RET-REASON3=R01 and R09 then move "B"; CA-RED-RET-REASON1 and CA-RED-RET-REASON2, and CA-RED-RET-REASON3 not equal to R01 or R09 then move "N"";

an eight ACH data conversion rule comprising a source data field of "CA-SETT-REDIST-CD", a target data field of "SETLACCTTYP", and an instruction comprising "If CA-SETT-REDIST-CD=R, S or E and CA-SETT-DA-POINT='9GL' move 'GL; if CA-SETT-REDIST-CD=P and PT-COL-DA-POINT='9GL' move 'GL; Else Move DDA";

a ninth ACH data conversion rule comprising a source data field of "CA-SETT-REDIST-CD", a target data field of "RTNFLOATBYP", and an instruction comprising "If CA-SETT-REDIST-CD=R, S, E or P then CPNY/FFLOT=N else Y";

a tenth ACH data conversion rule comprising a source data field of "CA-SETT-REDIST-CD", a target data field of "ACHCOID", and an instruction comprising "REDP; IF PT-COL-LEVEL-CD=A or P and CA-SETT-REDIST-CD equal to R, S, E, or P move CA-COMP-ID as is";

an eleventh ACH data conversion rule comprising a source data field of "CA-SETT-REDIST-CD", a target data field of "CSTLTY", and an instruction comprising "If CA-SETT-REDIST-CD=R, S, E, P: set value to REDP";

a twelfth ACH data conversion rule comprising a source data field of "CA-SETT-REDIST-CD", a target data field of "CSTLVL", and an instruction comprising "if CA-SETT-REDIST-CD equal to S, E, or P and CA-USER-AREA-CD7=I: set value to I, else if CA-SETT-REDIST-CD equal to R, S, E, or P and CA-USER-AREA-CD7<>I: set value to C";

a thirteenth ACH data conversion rule comprising a source data field of "CA-SETT-REDIST-CD", a target data field of "RTTRNNBRCSETL", and an instruction comprising "If CA-SETT-REDIST-CD=R, S or E move CA-SETT-TR as is"; and a fourteenth ACH data conversion rule comprising a source data field of "CA-SETT-REDIST-CD", a target data field of "ACHACCTNBRSETL", and an instruction comprising "If CA-SETT-REDIST-CD=P move PT-COL-TR as is; If CA-SETT-REDIST-CD=R move CA_SETT_RED_ACCT as is; If CA-SETT-REDIST-CD=S move CA-SETT-ACCT as is; if CA-SETT-REDIST-CD=E move CA-SETT-EXCP-ACCT as is; If CA-SETT-REDIST-CD=P move PT-COL-EXCP-ACCT as is unless null or spaces, then move CA-SETT-EXCP-ACCT as is".

17. A non-transitory computer readable medium comprising processor executable instructions, which when executed by a processor causes the processor to perform the steps of:
    determining a plurality of automated clearing house (ACH) data conversion rules, each of the plurality of ACH data conversion rules comprising:
        a name associated with a source data field of a source database;
        a name associated with a target data field of a target database; and
        an instruction indicating how to convert ACH data in the source data field into converted ACH data to be stored in the target data field;
    converting ACH data from the source database into converted ACH data according to the determined ACH data conversion rules; and
    storing the converted ACH data in the target database.

18. The medium of claim 17, wherein the converting ACH data into converted ACH data according to the determined ACH data conversion rules comprises performing the following for each of the determined ACH data conversion rules:
    determining the source data field, the target data field, and the instruction of the ACH data conversion rule; and
    receiving ACH data from the determined source data field of the source database; and
    converting the received ACH data into converted ACH data according to the determined instruction.

19. The medium of claim 17, wherein the plurality of ACH data conversion rules comprises a selected one of the following:
    a first ACH data conversion rule comprising a source data field of "PT-POINT-TYPE-CD", a target data field of "FILESOURCE", and an instruction comprising "If PT-POINT-TYPE-CD C, B, R, S move 2, If PT-POINT-TYPE-CD A=move 1";
    a second ACH data conversion rule comprising a source data field of "PT-COL-LEVEL-CD", a target data field of "RTTRNNBRCSETL", and an instruction comprising "If PT-COL-LEVEL-CD=P move PT-COL-TR as is; if PT_COL_LEVEL_CD=A move CA-SETT-TR as is;
    a third ACH data conversion rule comprising a source data field of "PT-SRCH-BEG-POS", a target data field of "FALTF", and an instruction comprising "If PT-SRCH-BEG POS= or >14 and < or =23 then move PT-SRCH-TEXT to ACHFILEID and set New Alt File Recognition Flag=N else set Alt File Recognition Flag to Y";
    a fourth ACH data conversion rule comprising a source data field of "PT-SRCH-BEG-POS", a target data field of "CALTR", and an instruction comprising "If PT-SRCH-BEG POS< or =94 then set NEW ALT FILE REC LEVEL=1, else 5";
    a fifth ACH data conversion rule comprising a source data field of "PT-SRCH-BEG-POS", a target data field of "QALTS", and an instruction comprising "if PT-SRCH-BEG-POS< or =94 move as is, else PT-SRCH-BEG-POS minus 94";

a sixth ACH data conversion rule comprising a source data field of "CA-RED-RET-REASON1", a target data field of "RDEPTRNOPTN", and an instruction comprising "If R18 do not convert";

a seventh ACH data conversion rule comprising a source data field of "CA-RED-RET-REASON1", a target data field of "CRETR", and an instruction comprising "if CA-RED-RET-REASON1 or CA-RED-RET-REASON2, or CA-RED-RET-REASON3=R01 and CA-RED-RET-REASON1, CA-RED-RET-REASON2, or CA-RED-RET-REASON3 not equal to R09 then move "1"; if CA-RED-RET-REASON1 or CA-RED-RET-REASON2, or CA-RED-RET-REASON3=R09 and CA-RED-RET-REASON1, CA-RED-RET-REASON2, or CA-RED-RET-REASON3 not equal to R01 then move "9"; if CA-RED-RET-REASON1 or CA-RED-RET-REASON2, or CA-RED-RET-REASON3=R01 and R09 then move "B"; CA-RED-RET-REASON1 and CA-RED-RET-REASON2, and CA-RED-RET-REASON3 not equal to R01 or R09 then move "N"";

an eight ACH data conversion rule comprising a source data field of "CA-SETT-REDIST-CD", a target data field of "SETLACCTTYP", and an instruction comprising "If CA-SETT-REDIST-CD=R, S or E and CA-SETT-DA-POINT='9GL' move 'GL; if CA-SETT-REDIST-CD=P and PT-COL-DA-POINT='9GL' move 'GL; Else Move DDA";

a ninth ACH data conversion rule comprising a source data field of "CA-SETT-REDIST-CD", a target data field of "RTNFLOATBYP", and an instruction comprising "If CA-SETT-REDIST-CD=R, S, E or P then CPNY/FFLOT=N else Y";

a tenth ACH data conversion rule comprising a source data field of "CA-SETT-REDIST-CD", a target data field of "ACHCOID", and an instruction comprising "REDP; IF PT-COL-LEVEL-CD=A or P and CA-SETT-REDIST-CD equal to R, S, E, or P move CA-COMP-ID as is";

an eleventh ACH data conversion rule comprising a source data field of "CA-SETT-REDIST-CD", a target data field of "CSTLTY", and an instruction comprising "If CA-SETT-REDIST-CD=R, S, E, P: set value to REDP";

a twelfth ACH data conversion rule comprising a source data field of "CA-SETT-REDIST-CD", a target data field of "CSTLVL", and an instruction comprising "if CA-SETT-REDIST-CD equal to S, E, or P and CA-USER-AREA-CD7=I: set value to I, else if CA-SETT-REDIST-CD equal to R, S, E, or P and CA-USER-AREA-CD7<>I: set value to C";

a thirteenth ACH data conversion rule comprising a source data field of "CA-SETT-REDIST-CD", a target data field of "RTTRNNBRCSETL", and an instruction comprising "If CA-SETT-REDIST-CD=R, S or E move CA-SETT-TR as is"; and a fourteenth ACH data conversion rule comprising a source data field of "CA-SETT-REDIST-CD", a target data field of "ACHACCTNBRSETL", and an instruction comprising "If CA-SETT-REDIST-CD=P move PT-COL-TR as is; If CA-SETT-REDIST-CD=R move CA_SETT_RED_ACCT as is; If CA-SETT-REDIST-CD=S move CA-SETT-ACCT as is; if CA-SETT-REDIST-CD=E move CA-SETT-EXCP-ACCT as is; If CA-SETT-REDIST-CD=P move PT-COL-EXCP-ACCT as is unless null or spaces, then move CA-SETT-EXCP-ACCT as is".

\* \* \* \* \*